(12) United States Patent
Venezia

(10) Patent No.: US 10,137,757 B2
(45) Date of Patent: Nov. 27, 2018

(54) AIR CONDITIONING SYSTEM FOR HEATING AND AIR CONDITIONING A MOTOR VEHICLE

(71) Applicant: BEHR GmbH & Co. KG, Stuttgart (DE)

(72) Inventor: Vincenzo Venezia, Weil im Schönbuch (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 806 days.

(21) Appl. No.: 14/499,490

(22) Filed: Sep. 29, 2014

(65) Prior Publication Data

US 2015/0090424 A1 Apr. 2, 2015

(30) Foreign Application Priority Data

Sep. 30, 2013 (DE) .................. 10 2013 219 811

(51) Int. Cl.
*B60H 1/00* (2006.01)
*B60H 1/06* (2006.01)

(52) U.S. Cl.
CPC ....... *B60H 1/00842* (2013.01); *B60H 1/0005* (2013.01); *B60H 1/06* (2013.01); *B60H 2001/00092* (2013.01)

(58) Field of Classification Search
CPC .... B60H 1/0005; B60H 1/00842; B60H 1/06; B60H 2001/00092
USPC .............................. 165/42, 43, 202, 203, 204
See application file for complete search history.

(56) References Cited

U.S. PATENT DOCUMENTS

| | | | | | |
|---|---|---|---|---|---|
| 4,549,692 | A | * | 10/1985 | Busch ................ | B60H 1/00064 236/13 |
| 4,595,051 | A | * | 6/1986 | Cadars ............... | B60H 1/00042 165/103 |
| 5,701,949 | A | * | 12/1997 | Yamaguchi ........ | B60H 1/00664 137/872 |
| 5,950,711 | A | * | 9/1999 | Bendell ............... | B60H 1/0005 165/126 |

(Continued)

FOREIGN PATENT DOCUMENTS

| | | | |
|---|---|---|---|
| CA | 2485786 A1 * | 4/2006 | ......... B60H 1/00678 |
| DE | 603 09 377 T2 | 10/2007 | |

(Continued)

OTHER PUBLICATIONS

German Search Report, Appl. No. 10 2013 219 811,6, dated May 6, 2014, 7 pgs.

*Primary Examiner* — Ljiljana Ciric
(74) *Attorney, Agent, or Firm* — Paul D. Strain, Esq.; Strain & Strain PLLC

(57) ABSTRACT

Air conditioning systems for heating and air conditioning a motor vehicle including a first heat exchanger, a second heat exchanger, a first flow channel, a second flow channel, and a flow guidance element fixed on the second heat exchanger or a retaining device. A flow is able to pass around both heat exchangers along the second flow channel and around only the first heat exchanger along the first flow channel. The flow guidance element projects into a branching region where air inside the system branches at an angle with respect to a face of the second heat exchanger, and the flow guidance element influences such air in the region between the heat exchangers.

12 Claims, 1 Drawing Sheet

(56) References Cited

U.S. PATENT DOCUMENTS

| | | | | |
|---|---|---|---|---|
| 5,983,987 A * | 11/1999 | Weindorf | B60H 1/00671 | 165/103 |
| 6,270,400 B1 * | 8/2001 | Tsurushima | B60H 1/00857 | 454/121 |
| 6,278,083 B1 * | 8/2001 | Schwarz | B60H 1/0005 | 219/202 |
| 6,295,973 B1 * | 10/2001 | Yang | F02B 1/12 | 123/543 |
| 6,347,988 B1 * | 2/2002 | Kurokawa | B60H 1/00692 | 165/42 |
| 6,351,961 B1 * | 3/2002 | Kurokawa | B60H 1/0005 | 454/121 |
| 6,482,081 B2 * | 11/2002 | Vincent | B60H 1/00064 | 165/42 |
| 6,889,761 B2 * | 5/2005 | Perry | B60H 1/00678 | 165/103 |
| 6,971,440 B1 * | 12/2005 | Beck | B60H 1/00064 | 165/103 |
| 7,694,729 B2 * | 4/2010 | Uemura | B60H 1/00692 | 165/202 |
| 7,954,540 B2 * | 6/2011 | Hoehn | B60H 1/0005 | 165/103 |
| 9,821,626 B2 * | 11/2017 | Wittmann | B60H 1/0005 | |
| 2003/0010474 A1 * | 1/2003 | Araki | B60H 1/00535 | 165/42 |
| 2003/0045224 A1 * | 3/2003 | Vincent | B60H 1/0005 | 454/156 |
| 2004/0069444 A1 * | 4/2004 | Clifford | B60H 1/00678 | 165/42 |
| 2004/0192185 A1 * | 9/2004 | Le | B60H 1/00064 | 454/156 |
| 2004/0244962 A1 * | 12/2004 | Tokunaga | B60H 1/00057 | 165/203 |
| 2005/0170769 A1 * | 8/2005 | Kaszycki | B60H 1/0005 | 454/121 |
| 2005/0257925 A1 * | 11/2005 | Koukouravas | B60H 1/00064 | 165/202 |
| 2006/0094346 A1 * | 5/2006 | Haupt | B60H 1/0005 | 454/154 |
| 2006/0144582 A1 * | 7/2006 | Sekiya | B60H 1/00692 | 165/202 |
| 2006/0151162 A1 * | 7/2006 | Kiel | B60H 1/00685 | 165/204 |
| 2006/0196205 A1 * | 9/2006 | Richter | B60H 1/0005 | 62/239 |
| 2007/0000658 A1 * | 1/2007 | Koukouravas | B60H 1/00028 | 165/202 |
| 2007/0044950 A1 * | 3/2007 | Halder | B60H 1/00064 | 165/202 |
| 2007/0077879 A1 * | 4/2007 | Marshall | B60H 1/00685 | 454/121 |
| 2007/0137832 A1 * | 6/2007 | Wolf | B60H 1/0055 | 165/42 |
| 2008/0200110 A1 | 8/2008 | Ghosh et al. | | |
| 2009/0036048 A1 * | 2/2009 | Rademacher | B60H 1/00678 | 454/156 |
| 2009/0229788 A1 * | 9/2009 | Chikagawa | B60H 1/00028 | 165/61 |
| 2009/0250193 A1 * | 10/2009 | Ishikawa | B60H 1/00028 | 165/61 |
| 2010/0025011 A1 * | 2/2010 | Chikagawa | B60H 1/00028 | 165/61 |
| 2011/0009043 A1 * | 1/2011 | Nanaumi | B60H 1/00564 | 454/121 |
| 2011/0138850 A1 * | 6/2011 | Suzuki | B60H 1/00328 | 62/524 |
| 2014/0075974 A1 * | 3/2014 | Klein | B60H 1/3202 | 62/119 |
| 2014/0075975 A1 * | 3/2014 | Graaf | B60H 1/00007 | 62/119 |

FOREIGN PATENT DOCUMENTS

| | | | | |
|---|---|---|---|---|
| EP | | 0983885 A2 * | 3/2000 | B60H 1/00678 |
| EP | | 1469258 A1 * | 10/2004 | F24F 13/1413 |
| FR | | 2 783 756 A1 | 3/2000 | |

\* cited by examiner

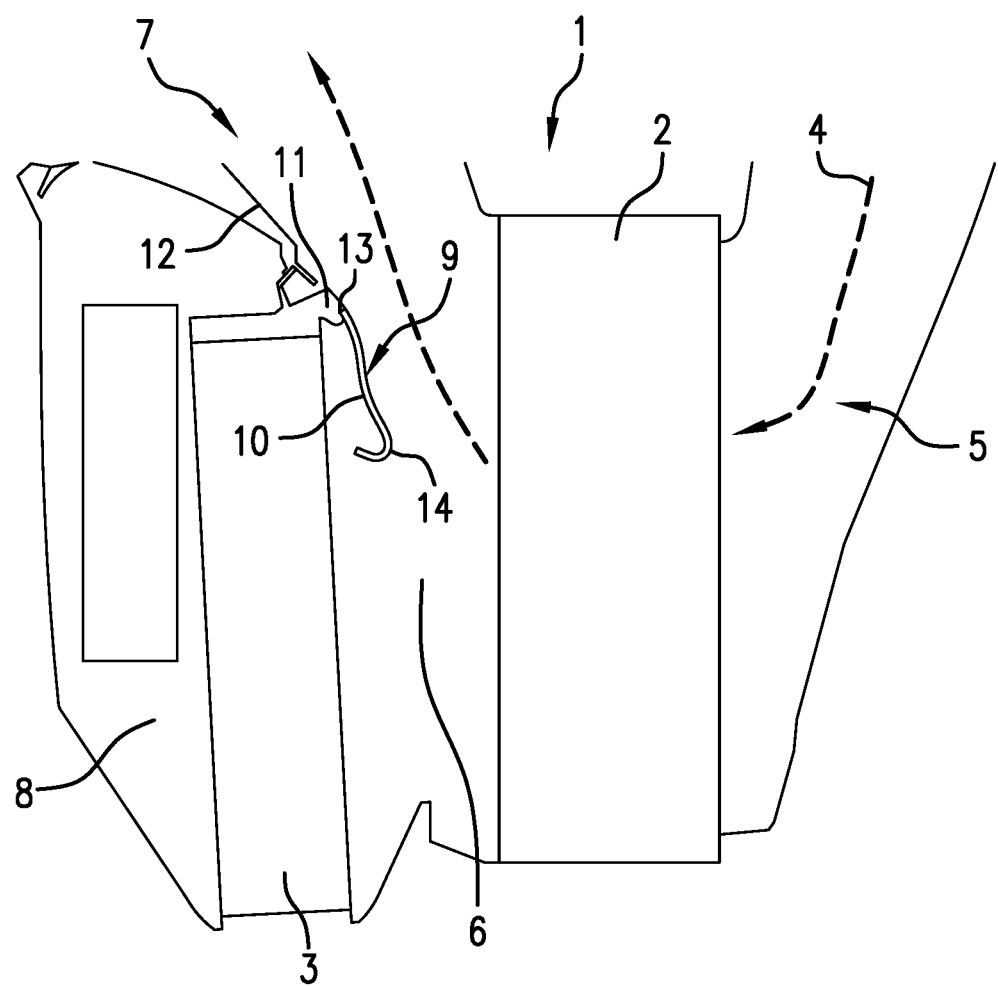

AIR CONDITIONING SYSTEM FOR HEATING AND AIR CONDITIONING A MOTOR VEHICLE

CROSS-REFERENCE TO RELATED PATENT APPLICATIONS

This application is based upon and claims the benefit of priority from prior German Patent Application No. 10 2013 219 811.6, filed Sep. 30, 2013, the entire contents of which are incorporated herein by reference in their entirety.

TECHNICAL FIELD

The invention relates to an air conditioning system for heating and air conditioning a motor vehicle, comprising a first heat exchanger and a second heat exchanger, the air conditioning system having a first flow channel and a second flow channel and flow being able to pass around both heat exchangers along the second flow channel and around only the first heat exchanger along the first flow channel.

THE PRIOR ART

Air conditioning systems in motor vehicles are utilized to heat and cool air or to influence other features of the cabin air. For this purpose air conditioning systems normally have an evaporator and a heating element.

The heating element often has a through-flow of water by which an air flow can be heated. Heating elements which have a separate valve for interrupting the water flow through the heating element are known, as well as heating elements without such a separate valve.

Especially in the case of heating elements which have no additional measures for interrupting the water flow through the heating element, unwanted residual heating of the air in the interior of the air conditioning system can take place. This is especially a problem if undesired residual heating occurs in an operating situation in which maximum cooling of the air inside the air conditioning system is to be achieved. As a result of the residual heating, the temperature control of the air inside the air conditioning system is not optimal.

A particular disadvantage of the solutions in the prior art is that unwanted residual heating of the air inside the air conditioning system can occur if no separate means for interrupting the water flow in the heating element are provided. It is also disadvantageous that the complexity and therefore the cost of the air conditioning system are increased by an additional means such as a valve.

DESCRIPTION OF THE INVENTION, OBJECTIVE, SOLUTION, ADVANTAGES

It is therefore the object of the present invention to provide an air conditioning system which reduces or completely prevents the unwanted residual heating of the air inside the air conditioning system. The structure of the air conditioning system is also especially simple and is optimized as compared to the solutions in the prior art.

The object of the present invention is achieved by an air conditioning system having the features of claim 1.

An exemplary embodiment of the invention relates to an air conditioning system for heating and air conditioning a motor vehicle comprising a first heat exchanger and a second heat exchanger, the air conditioning system having a first flow channel and a second flow channel and flow being able to pass around both heat exchangers along the second flow channel and around only the first heat exchanger along the first flow channel, and a flow guidance element, by which an air flow in a region between the heat exchangers can be influenced, being arranged in the form of a wall section on the second heat exchanger.

The flow guidance element is advantageously in the form of a wall section. It extends over the full width of the flow channel and preferably covers the second heat exchanger over its full width and at least a partial area of its height. The flow guidance element thereby contributes to allowing none or only a small amount of the air quantity which flows through and is cooled in the first heat exchanger to flow through the second heat exchanger. It is thereby achieved that undesired reheating of the air quantity through unintendedly flowing around the second heat exchanger does not occur. This example applies, in particular, if the first heat exchanger is an evaporator and the second heat exchanger is a heating element. In the case of the inverse arrangement, unwanted cooling of already heated air is reduced or entirely prevented by the flow guidance element.

The flow guidance element is in the form, for example, of a plastics molding. The flow guidance element is advantageously arranged in such a way that it can influence, in particular, the air flow between the first and the second heat exchanger. This is advantageous since the deflection into either a second flow channel leading through the second heat exchanger, or into a first flow channel leading past the second heat exchanger, usually takes place in this region.

It is also advantageous if the flow guidance element is arranged in such a way that the air flow into the first flow channel from a region arranged downstream of the first heat exchanger can be influenced by the flow guidance element, whereby the proportion of the air flow passing around the second heat exchanger can be reduced by the flow guidance element.

The flow guidance element advantageously assists the flow of air into the first flow channel which leads past the second heat exchanger. The proportion of the unwanted air flow passing through the second heat exchanger is thereby reduced at the same time.

In addition, it may be advantageous if the flow guidance element has an undulating or rectilinear section followed by a curved section forming an arc.

The shaping of the flow guidance element is advantageously such that congestion points which would negatively influence the through-flow do not form in or on the flow guidance element. The efficiency of the air conditioning system is negatively influenced by an increase in the pressure loss resulting from congestion sites or other negative influences on flow.

It may also be useful if the arcuate section is curved towards the second heat exchanger.

Such shaping is advantageous, in particular, in avoiding the formation of congestion sites for the air flow. Calming of the air flow guided through the heat exchanging network of the second heat exchanger can be achieved at the same time.

Furthermore, it may be especially advantageous if the flow guidance element has an S-shaped section and, in its free end region, a C-shaped section curved towards the second heat exchanger.

In this case the flow guidance element advantageously has an S-shaped configuration especially in a section directly adjoining the foot region of the flow guidance element. The curvature of the bends may be adapted to the installation situation and the space conditions. Here, the foot region is the region with which the flow guidance element is mounted to the second heat exchanger.

The free end region of the flow guidance element is advantageously formed by a C-shaped region curved towards the second heat exchanger. In its advantageous configuration, this free end region serves to calm the air flow and deflect it in an optimized manner.

It is also preferable if the flow guidance element is arranged on an edge region adjoining the heat exchanging network of the second heat exchanger.

The flow guidance element is preferably attached to the second heat exchanger on one of the edge regions of the second heat exchanger. In this way masking of the heat exchanging network by the flow guidance element is reduced. An arrangement of the flow guidance element on an edge region bordering the heat exchanging network is further advantageous in order to optimize guidance of the air into the first flow channel which leads past the second heat exchanger.

In this way, in an installation situation in which the second heat exchanger is accommodated in a receptacle of a wall delimiting the flow channel, it can be achieved that the flow guidance element represents a prolongation of the wall delimiting the flow channel concerned. A more optimal overall air flow past the second heat exchanger can thereby be achieved.

A preferred exemplary embodiment is characterized in that the second heat exchanger has a projection extending towards the first flow channel, on which projection the flow guidance element is arranged.

A projection to which the flow guidance element is attached may be formed on the second heat exchanger either integrally or as a further, attached part. The projection is advantageously dimensioned in such a way that the flow guidance element is arranged substantially in a rectilinear prolongation of a wall delimiting the first flow channel. Through this configuration the formation of steps and irregularities in the walls, or between the walls and the flow guidance element, can be avoided, contributing to a more advantageous air flow.

In an especially favorable configuration of the invention it is further provided that the flow guidance element extends in a direction transverse to the air flow direction over the full width of the first flow channel or of the second flow channel.

The flow guidance element is advantageously configured such that the flow channel concerned is covered over its full width by the flow guidance element. In this way leakage flows past the flow guidance element can be reduced or completely prevented. In an advantageous configuration the flow guidance element may have lateral sealing elements which seal the flow guidance element with respect to the walls of the flow channels.

It is further preferable if the flow guidance element is arranged inclined at an angle to the front face of the second heat exchanger.

Through an arrangement at a specifiable angle to the front face of the second heat exchanger, an advantageous orientation of the flow guidance element with respect to the walls of the flow channels, in particular to a wall of the first flow channel, can be achieved. In addition, it can be achieved by means of an angle between the flow guidance element and the front face that a geometry narrowing towards the foot region of the flow guidance element is produced, making possible a through-flow as complete as possible through the heat-exchanging network of the second heat exchanger, to the extent that this is desired.

Through the provision of an angle, an alignment of the flow guidance element more favorable to the overall flow can be achieved since the flow guidance element can be adapted to the flow path of the air. Here, it is especially advantageous to adapt the flow guidance element to the flow path leading through the first heat exchanger and past the second heat exchanger.

In an alternative configuration of the invention it may be provided that the flow guidance element is disposed approximately in a rectilinear prolongation of one of the walls delimiting the first flow channel. This is especially advantageous in ensuring a guidance of the air flow as free as possible of steps and interruptions.

According to an especially preferred development of the invention it may be provided that a branching region, in which the second flow channel branches off from the first flow channel, is provided, the branching region being arranged between the first heat exchanger and the second heat exchanger.

The branching into the first flow channel and into the second flow channel advantageously takes place in a region located between the first and the second heat exchanger. In this case the two flow channels still coincide as they pass through the first heat exchanger and are separated only directly after passing through same. In an advantageous configuration the division of the air flow may be influenced by further guide elements or by adjustable flaps.

In addition, it may be advantageous if the second heat exchanger is covered by the flow guidance element in a range from 5% to 50% of its height, and preferably is covered in a range from 5% to 25%.

Measured by the height of the second heat exchanger, the flow guidance element preferably covers not more than 50% or not more than 25% of the second heat exchanger. This ensures that sufficient flow through the second heat exchanger is also possible at all times. Complete covering, or covering provided over large areas, can be detrimental to the flow through the second heat exchanger.

It is also preferable if the first heat exchanger is an evaporator and the second heat exchanger is a heating element, the first flow channel and the second heating channel following a Y-shaped path and a division into the first flow channel and the second flow channel being provided in a region between the heat exchangers, the first flow channel being guided past and above the second heat exchanger.

By the use of an evaporator as the first heat exchanger, cooling of the air flow can first be achieved. The air can then either be heated in the heating element or guided past the heating element. Especially in air conditioning systems without a separate means of switching off the water flow in the heating element, unwanted heating of the airflow as a result of residual heat in the heating element may occur. The flow guidance element may reduce the proportion of air flowing through the heating element or even entirely prevent air from flowing through the heating element.

Advantageous developments of the present invention are described in the dependent claims and in the following description of the FIGURES.

BRIEF DESCRIPTION OF THE DRAWINGS

The invention is explained in detail below with reference to exemplary embodiments and to the drawing, in which:

FIG. 1 is a schematic view of an air conditioning system having an optimized flow guidance wall, the flow guidance wall being arranged between the evaporator and the heating element of the air conditioning system.

PREFERRED EMBODIMENT OF THE INVENTION

FIG. 1 shows a schematic sectional view through an air conditioning system 1. The air conditioning system 1 comprises a first heat exchanger 2 and a second heat exchanger 3. In this case the first heat exchanger 2 is advantageously formed by an evaporator. The second heat exchanger 3 is advantageously formed by a heating element. A fluid flowing along the flow path 4 flows to the first heat exchanger 2 along a flow channel 5. The first heat exchanger 2 has a heat exchanging network around which the fluid, which is preferably air, flows along the flow path 4. A region 6 is arranged between the first heat exchanger 2 and the second heat exchanger 3.

In this region 6 the flow channel 5 is subdivided into an upwardly directed first flow channel 7 and a second flow channel 8 directed downwardly through the second heat exchanger 3. The upper first flow channel 7 and the lower second flow channel 8 form with the common inflow section 5 a Y-shaped split of the flow channels 5, 7 and 8.

To the extent that air flows onwards along the upper first flow channel 7, there is little or no flow through the second heat exchanger 3. To the extent that air flows onwards along the second lower channel 8, the entire air quantity, or at least a large part of the air quantity, flows through the second heat exchanger 3.

The second heat exchanger 3 is preferably formed by a heating element through which water flows. It serves to heat the air flow passing through the second heat exchanger 3.

In an operating state in which the air flowing through the air conditioning system 1 is to be cooled to the maximum extent the air is guided in such a way that it flows through the first heat exchanger 2, which is formed by an evaporator, and finally is guided via the first flow channel 7 past the second heat exchanger 3, which is formed by a heating element. In order to achieve maximum cooling of the air it is advantageous if as little heat as possible is transferred from the second heat exchanger 3 to the air flow directed through the first heat exchanger 2. Accordingly, it is advantageous for the air flow along the flow path 4 to be at the greatest possible distance from the heated second heat exchanger 3.

For this purpose a flow guidance element 9 is provided in the region 6 arranged between the first heat exchanger 2 and the second heat exchanger 3. This flow guidance element 9 has a first S-shaped section 10 and a section 14, curved to form a C-shape, connected thereto. The C-shaped section 14 is arranged on the free end region of the flow guidance element 9. Furthermore, the C-shaped end section 14 is curved towards the second heat exchanger 3 and is open.

The foot of the flow guidance element 9 is mounted on a region, in the form of a projection 11, either of the second heat exchanger 3 or of a retaining device which fixes the second heat exchanger 3 inside the second flow channel 8 of the air conditioning system 1.

In the example of FIG. 1 the flow guidance element 9 is oriented at a predetermined angle with respect to the front face of the second heat exchanger 3. It is thereby achieved that the C-shaped region 14 is at a greater distance from the front face of the second heat exchanger 3 than the foot region 13 of the flow guidance element 9 with which the flow guidance element 9 is attached to the projection 11.

In the example of FIG. 1, the flow guidance element 9 is configured such that a substantially rectilinear prolongation of the inner wall 12 of the first flow channel 7 is formed by the flow guidance element 9. A smooth surface free of steps and edges over which the air can flow without causing additional turbulence or congestion of the air flow is therefore produced.

Furthermore, a sealing means is provided between the second heat exchanger 3 and the wall 12 of the first flow channel 7, which sealing means serves, firstly, to position the second heat exchanger 3 and, secondly, to prevent a leakage air flow around the second heat exchanger 3.

In alternative embodiments, the flow guidance element may also be oriented at a different angle to the front face of the heat exchanger on which it is arranged. In principle, it is preferable if the flow guidance element forms with the wall of the first flow channel a constant surface free of abrupt changes and steps, over which the air flow can pass without major flow losses.

By means of the flow guidance element 9, the air flow passing through the first heat exchanger 2 is to be diverted as completely as possible into the first flow channel 7, in order to reduce, as far as possible, or preferably entirely to prevent, unwanted heating by the second heat exchanger 3.

The provision of a flow guidance element 9 is especially advantageous if the flow of the heating water through the second heat exchanger 3 cannot be controlled by a separate shut-off valve. In that case a heating medium still flows at least partially through the second heat exchanger 3, whereby the temperature of the second heat exchanger 3 is increased or maintained at a high level. This unavoidably leads to heating of the air flow coming into contact with the second heat exchanger 3.

The separation of the air flows into the first flow channel 7 and the second flow channel 8 may advantageously also be assisted by further elements, for example flap elements. The flow guidance element 9 covers a portion of the height of the second heat exchanger 3 which is preferably between 5% and 50% of the overall height of the second heat exchanger 3. In the exemplary embodiment of FIG. 1 shown here, the flow guidance element covers approximately 25% of the height of second heat exchanger 3.

Depending on the size of the individual heat exchangers 2, 3 and on the size of the region 6 between the heat exchangers 2, 3, and in particular on the distance between the first heat exchanger 2 and the second heat exchanger 3, the flow guidance element 9 may be correspondingly larger or smaller, or may be oriented at different angles of inclination to the front face of the second heat exchanger 3.

In an alternative embodiment, the S-shaped section 10 of the flow guidance element 9 may also have sharper curvatures. A completely rectilinear configuration or a configuration adapted to the curvature of the wall 12 of the first flow channel 7 may likewise be provided.

The C-shaped region 14 curved towards the second heat exchanger 3 is especially advantageous in preventing congestion of the airflow at the free end region of the flow guidance element 9. The curved region 14 is also configured to be open towards the second heat exchanger.

The flow guidance element 9 is advantageously configured such that it covers the full width of the respective flow channel 5, 7 or 8 which extends along a planar normal on the plane of the drawing. In an advantageous embodiment, sealing elements may be provided on the sides of the flow guidance element 9, sealing the flow guidance element 9 with respect to the walls of the respective flow channel. In this way a leakage flow past the flow guidance element 9 can be avoided.

In an alternative embodiment an adjustment mechanism, which allows the angle between the substantially rectilinear region of the flow guidance element and the front face of the second heat exchanger to be changed, may be provided in the foot region of the flow guidance element 9.

The flow guidance element 9 may be used especially advantageously in an air conditioning system 1 which does not have a separate shut-off means for the water flow in the heating element 3. The same applies to an air conditioning system 1 which has no additional means for deflecting and influencing the air flow between the first heat exchanger 2 and the second heat exchanger 3.

FIG. 1 shows an exemplary embodiment of an air conditioning system comprising an arrangement of a first heat exchanger and a second heat exchanger. The representation shown in FIG. 1 is intended to clarify the idea of the invention and serves in particular to show the arrangement of the flow guidance element and the configuration of the flow guidance element. FIG. 1 is not restrictive with respect to the dimensions, geometry and orientation of the individual elements relative to one another.

The invention claimed is:

1. An air-conditioning system for heating and air conditioning a motor vehicle, comprising
a housing
a first heat exchanger arranged in the housing,
a second heat exchanger arranged in the housing,
a flow guidance element, and
a flow channel through the housing,
wherein the flow channel begins upstream of the first heat exchanger and continues through the first heat exchanger into a branching region arranged between the first heat exchanger and the second heat exchanger, wherein in the branching region the flow channel divides into an upper first flow channel and a lower second flow channel, wherein the upper first flow channel does not pass through the second heat exchanger, wherein the lower second flow channel continues through the second heat exchanger,
wherein the flow guidance element is fixed on the second heat exchanger or a retaining device that fixes the second heat exchanger in the second flow channel and projects into the branching region at an angle with respect to a face of the second heat exchanger, wherein the flow guidance element has an undulating or rectilinear section and an adjoining arcuately curved section, wherein the arcuately curved section is arranged on a free end region of the flow guidance element and is curved at the end of the arcuately curved section towards the second heat exchanger.

2. The air-conditioning system according to claim 1, wherein the flow guidance element is arranged such that a fluid flow into the upper first flow channel from the branching region is influenced by the flow guidance element, and the proportion of a fluid flow passing around the second heat exchanger is reduced by the flow guidance element.

3. The air-conditioning system according to claim 1, wherein the flow guidance element has an S-shaped section and an adjoining C-shaped section curved towards the second heat exchanger arranged on a free end region of the flow guidance element.

4. The air-conditioning system according to claim 1, wherein the flow guidance element is arranged on an edge region of the second heat exchanger bordering a heat exchanging network of the second heat exchanger.

5. The air-conditioning system according to claim 1, wherein the second heat exchanger has a projection extending towards the first flow channel, on which projection the flow guidance element is arranged.

6. The air-conditioning system according to claim 1, wherein the flow guidance element extends in a direction transverse to the first flow channel.

7. The air-conditioning system according to claim 1, wherein the flow guidance element is disposed in a rectilinear prolongation of a wall delimiting the first flow channel.

8. The air-conditioning system according to claim 1, wherein the flow guidance element extends over the face of the second heat exchanger, wherein the second heat exchanger is covered by the flow guidance element in a range from 5% to 50% of the height of the second heat exchanger.

9. The air-conditioning system according to claim 1, wherein the first heat exchanger is an evaporator and the second heat exchanger is a heating element.

10. The air-conditioning system according to claim 1, wherein the flow guidance element comprises a region abutting a wall delimiting the first flow channel and is formed such that the interface between the flow guidance element and the wall is free of steps and edges that would cause a turbulent air flow.

11. The air-conditioning system according to claim 1, wherein the flow guidance element extends in a direction transverse to the second flow channel.

12. An air-conditioning system for heating and air conditioning a motor vehicle, comprising
a housing,
a first heat exchanger arranged in the housing,
a second heat exchanger arranged in the housing,
a flow guidance element, and
a flow channel through the housing,
wherein the flow channel begins upstream of the first heat exchanger and continues through the first heat exchanger into a branching region arranged between the first heat exchanger and the second heat exchanger, wherein in the branching region the flow channel divides into an upper first flow channel and a lower second flow channel, wherein the upper first flow channel does not pass through the second heat exchanger, wherein the lower second flow channel continues through the second heat exchanger,
wherein the flow guidance element is fixed on the second heat exchanger or a retaining device that fixes the second heat exchanger in the second flow channel and projects into the branching region at an angle with respect to a face of the second heat exchanger, wherein the flow guidance element has an S-shaped section and an adjoining C-shaped section curved towards the second heat exchanger, wherein the C-shaped section is arranged on a free end region of the flow guidance element, wherein the second heat exchanger has a projection extending towards the first flow channel, on which the flow guidance element is arranged, wherein the flow guidance element comprises a region abutting a wall delimiting the first flow channel and is formed such that the interface between the flow guidance element and the wall is free of steps and edges that would cause a turbulent air flow.

* * * * *